No. 670,319. Patented Mar. 19, 1901.
H. T. HILLISCHER.
UNDERGROUND CURRENT SUPPLY FOR ELECTRIC RAILWAYS.
(Application filed Oct. 26, 1900.)
(No Model.) 2 Sheets—Sheet 1.

WITNESSES:
F. W. Wright
A. C. Connor

INVENTOR
HERMANN T. HILLISCHER
BY Howson and Howson
HIS ATTORNEYS.

No. 670,319. Patented Mar. 19, 1901.
H. T. HILLISCHER.
UNDERGROUND CURRENT SUPPLY FOR ELECTRIC RAILWAYS.
(Application filed Oct. 26, 1900.)
(No Model.) 2 Sheets—Sheet 2.

WITNESSES:
F. W. Wright
S. C. Connor

INVENTOR
HERMANN T HILLISCHER
BY
Howson and Howson
HIS ATTORNEYS

UNITED STATES PATENT OFFICE.

HERMANN THEODOR HILLISCHER, OF VIENNA, AUSTRIA-HUNGARY.

UNDERGROUND CURRENT-SUPPLY FOR ELECTRIC RAILWAYS.

SPECIFICATION forming part of Letters Patent No. 670,319, dated March 19, 1901.

Application filed October 26, 1900. Serial No. 34,433. (No model.)

*To all whom it may concern:*

Be it known that I, HERMANN THEODOR HILLISCHER, imperial and royal court doctor, a subject of the Emperor of Austria-Hungary, residing at Vienna, in the Empire of Austria-Hungary, have invented certain new and useful Improvements in Underground Current-Supply for Electric Railways; and I do hereby declare the following to be a full, clear, and exact description of the invention, such as will enable others skilled in the art to which it appertains to make and use the same.

This invention relates to improvements in connection with that type of underground current-supply for electric railways in which a magnet is carried on the vehicle, said magnet being adapted to form contact with iron contact-bolts sunk in the permanent way, and thereby excite these bolts in such a manner as to cause contact-levers to be attracted by such bolts, which then establish an electrical connection between the bolts and the main conductor. In this manner the current from the main is enabled to pass through the bolts and magnet into the driving-motor of the vehicle. It is of course understood that the magnet is arranged to form contact with a series of contact-bolts in such a manner that contact is made with one pair of bolts before leaving the previous pair in order that a continuous current-supply to the motor may be insured.

The object of this invention is to prevent bolts from remaining connected with the main after the magnet has left them and at the same time to provide means whereby ready inspection, repairing, and maintaining of the contact-boxes may be effected.

The invention will be clearly understood from the accompanying drawings, in which—

Figure 1:
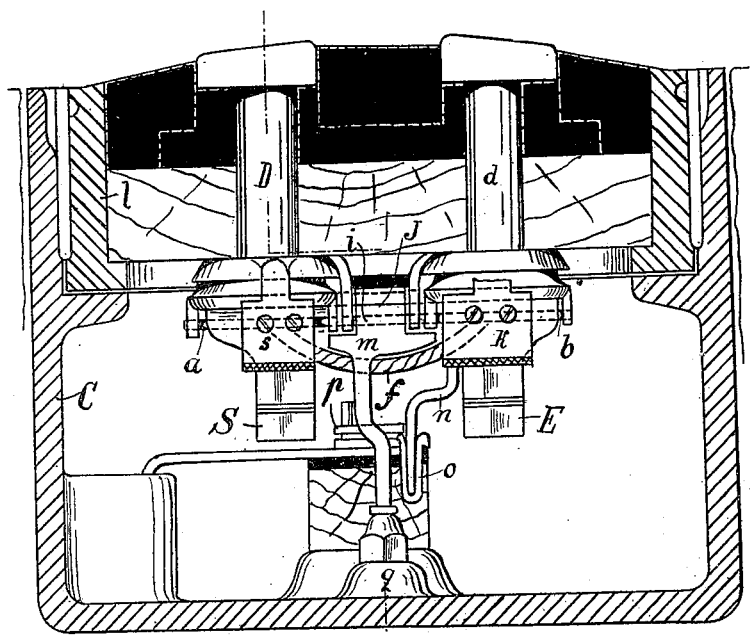
Figure 2:
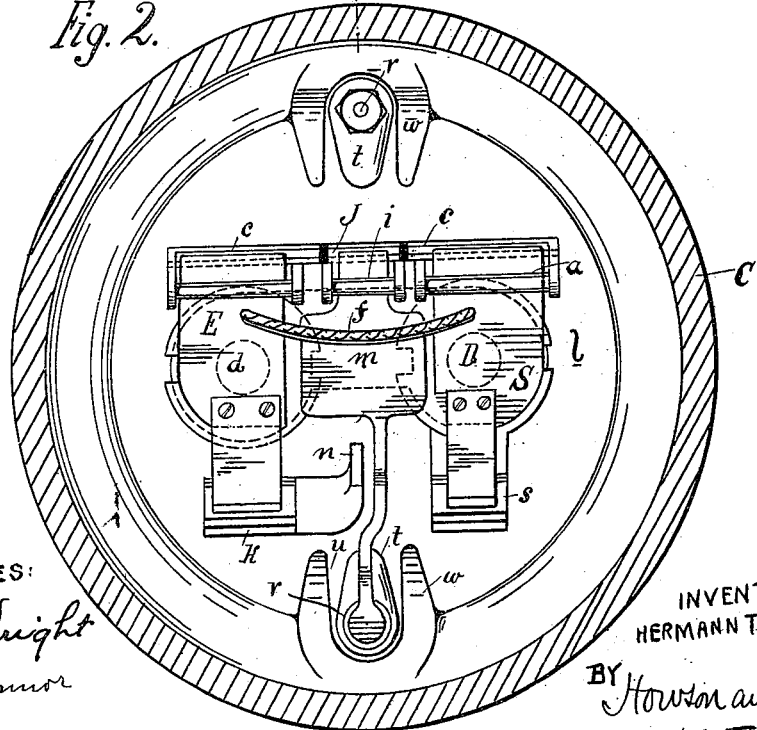
Figure 3:
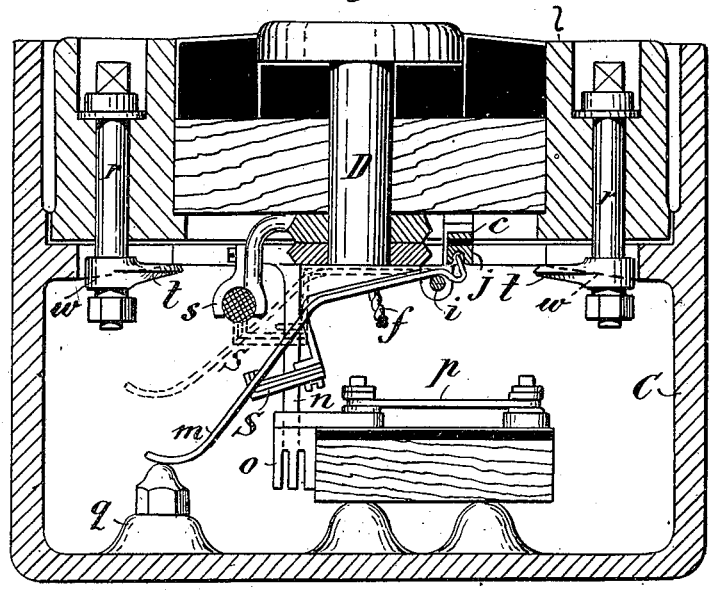

Figure 1 is a front elevation, partly in section. Fig. 2 is an inverted plan; Fig. 3, a side view, partly in section; and Fig. 4, a diagram showing the arrangement in circuit.

C is the contact-box, placed between the rails, the cover $l$ of which carries the magnetically-insulated contact-pins D $d$, which, however, are electrically connected together. Two contact-levers S E rest upon rods $a\,b$, respectively, which are electrically connected one with another by the wire $f$, but insulated from the bolts. The rear ends of the levers S E engage beneath an iron bar $c$, which is electrically connected with the rods $a\,b$, but insulated from the pins D $d$. Upon a bar $i$, electrically connected with the bolts, a third contact-lever $m$ rests, the rear end of which engages beneath an iron bar $j$, insulated from $a$, $b$, and $c$. A contact-piece $s$ is electrically connected with one of the contact-pins, D, and the lever S is allowed to rest against this piece when attracted by the said bolt, while a second contact-piece $k$ is insulated from the bolts, and against it the second lever E can repose when being attracted. All these parts—viz., the bolts, levers, the supporting-pieces for the latter, and the contact-pieces—are fixed to cover $l$.

In the box C is fixed an insulated spring-clamp $o$, which is connected to the main conductor K by means of a lead fuse $p$, and, further, also, a stop $q$ (back contact) for the armature $m$, such back contact being electrically connected with the body of the box and therefore connected to earth. A metal plate $n$, electrically connected with the insulated contact-piece $k$, is so fixed to the cover $l$ that when the latter is closed the metal plate is caused to engage in the spring-clamp $o$, thereby connecting the said contact-piece $k$ with the main line.

As long as the bolts $d$ D are not magnetized the contact-levers S E $m$ are disengaged—that is to say, are not in contact with the corresponding contact-pieces $k$ and $s$, respectively, and lever $m$ rests upon its back contact $q$. Thus the line between the main line K and the contact-bolts $d$ D is interrupted at two successive points $k$ and $s$, while the two bolts are connected to earth or grounded by the third contact-lever in conjunction with the back contact $q$. If now a car runs upon the contact-box, then the bolts D $d$ become magnetized by the car-magnet M and attract their armatures. At first the lever $m$ is raised, and this latter is for this purpose well balanced, so as to be readily moved, thus interrupting the earth connection of the contact-pins $d$ D. Then the contact-lever S and then contact-lever E are attracted, so as to establish contact with $s$ and $k$ and close the circuit. This successive attraction of the contact-levers can be insured by loading the lever S slightly and the lever E a little more.

Figure 4:
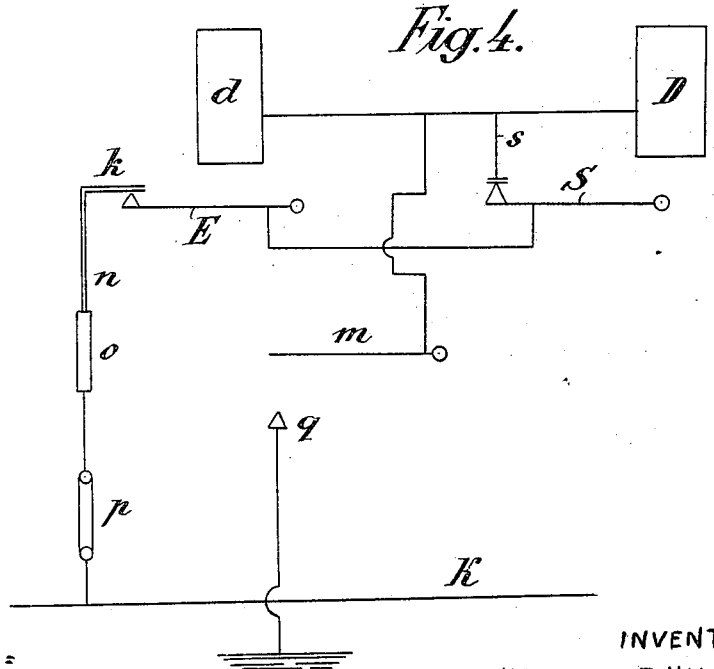

If now all three contact-levers are attracted, the current passes from the main line K through the lead fuse $p$ to the spring-clamp $o$ and to $k$, and thence through the contact-lever E, the loose cable between E and S, and through the latter contact-lever to the contact $s$, and thence to the bolts D $d$ and into the car-motor, as is clearly indicated in the diagram, Fig. 4. If now the car has passed over the contact-box, then the armature-lever E falls first, then S, and finally the lever $m$, so that thereby the parts are restored to the normal position, and the two bolts D $d$ are disconnected from the main line and connected to earth. Even if one of the contact-levers E or S for any reason sticks or adheres to its contact-pin, then nevertheless the connection between said bolts D $d$ and the main is interrupted at the other contact-lever, so that the contact-bolts are disconnected from the main, the said contact being arranged in series. If, however, both levers E S should stick to their contacts $k$ $s$, the armature $m$, which ordinarily carries no current and, in fact, is without a working contact, and therefore unable to become welded thereby to any part, will fall off, and thus connects the bolts $d$ D to earth. The current then passes from the main line K, as before stated, to the bolts $d$ D and thence through the lever $m$ and its contact $q$ to earth. The lead fuse $p$ melts immediately, thereby interrupting the connection between the main line and the contact-bolts. From this it will be clear that the arrangement between the main line and the contact-bolts of two breaks in series bridged over by the contact-levers and also the fact that the contact-bolts in the position of rest are connected to earth completely remove all danger of the bolt remaining connected with the main after the car has passed over the box. This contact-box can then be readily repaired by simply removing the cover $l$ and inserting a new lead fuse and, if necessary, also otherwise repairing the cover and then putting it on again, or a spare cover, kept in reserve, may be put in in place of the damaged cover. In either case the metal plate $n$ enters the clamp $o$, and thus places the box again in working order. This is rendered possible by fixing the bolts, together with the contact-levers and contacts, to the cover.

The cover may be removably fixed to the box in any desired manner. That shown in the drawings and which has been found to be really practical consists in the use of bolts $r$, adapted to turn in the cover, having laterally-projecting heads $t$ at the inner side of the cover, while the edge of the box is provided with notches $u$, which are so arranged that when the heads $t$ are directed toward the center of the box they may pass freely through the said notches. When the bolts $r$ are then turned, these heads engage with the inclined edges $w$ of the notches $u$, thus locking the cover in position. When then the bolts are turned back again, so that their heads $t$ coincide with the notches $u$, the cover is unlocked and can be removed by simply raising it.

I claim as my invention—

1. Apparatus for underground current-supply for electric railways, comprising a source of current-supply, bolts of magnetizable material, armatures for the bolts, electrical contacts for the armatures, all adapted to be in circuit with the source of supply and the bolts when said bolts are magnetized, in combination with another armature and a ground-contact for it, said armature being adapted to be in contact with ground and with the bolts only when said bolts are demagnetized.

2. Apparatus for underground current-supply for electric railways, comprising a source of current-supply, bolts, armatures therefor, contacts for the armatures, a fuse, another armature, normally without a current-carrying contact, and means whereby, upon the failure of the first armature to break the circuit, said last-named armature is adapted to make connection with the fuse and cause the same to melt and break the circuit.

3. Apparatus for underground current-supply for electric railways, bolts of magnetizable material, armatures for controlling the supply of current thereto and operated by the bolts when magnetized, an earth connection and another armature adapted to be influenced by magnetic force more readily than the first-named armature to break contact with the bolts and earth.

4. Apparatus for underground electric railways, comprising bolts, an armature to normally connect them to earth, in combination with other armatures normally disconnected to the bolts, an electromagnet carried by a vehicle adapted to magnetize the bolts, whereby the normal position of the armatures will be reversed to the extent of the first-named breaking contact with the bolts and the last-named making contact therewith, as and for the purpose set forth.

5. In underground current-supply for electric railways, in combination with an underground current-supply main, a contact-piece electrically connected therein through a lead fuse, an armature adapted to make contact with such contact-piece, an iron bolt adapted to attract such armature and to be energized by a magnet passing over the said bolt, a second iron bolt adapted to be energized by a magnet passing over the same, a second armature adapted to be attracted by the second magnet and to make contact with a second contact-piece electrically connected with the said iron bolts, an electric connection between the first and the second armature, a third armature electrically connected with the said bolts and adapted to be attracted by either or both of the said bolts and a grounded back contact for this third armature, substantially as and for the purpose described.

6. In combination with an underground supply-main, a box sunk in the permanent way and inclosing a lead fuse electrically connected with the supply-main, a spring-clamp electrically connected with the said fuse, a contact-piece adapted to engage such spring-clamp, an armature to make contact with such contact-piece, an iron bolt, adapted to attract such armature and to be energized by a magnet passing over the said bolt, a second iron bolt adapted to be energized by a magnet passing over the same, a second armature adapted to be attracted by the second bolt, and to make contact with a second contact-piece electrically connected with either or both of the said iron bolts, an electric connection between the first and the second armature, a third armature electrically connected with the said bolts and adapted to be attracted by either or both of the said bolts, and a grounded back contact for this third armature, a cover for such box, such cover carrying the bolts, the three armatures and the two contact-pieces and means for locking and unlocking the cover on the said box, substantially as and for the purpose described.

7. In combination with an underground supply-main, a box sunk in the permanent way and inclosing a lead fuse electrically connected with the supply-main, a spring-clamp electrically connected with said fuse, a contact-piece adapted to engage such spring-clamp, an armature adapted to make contact with such contact-piece, an iron bolt adapted to attract such armature and to be energized by a magnet passing over the said bolt, a second iron bolt adapted to be energized by a magnet passing over the same, a second armature adapted to be attracted by the second bolt, and to make contact with a second contact-piece electrically connected with either or both of the said iron bolts, an electric connection between the first and the second armature, a third armature electrically connected with the said bolts and adapted to be attracted by either or both of the said bolts and a grounded back contact, for this third armature, a cover for such box, such cover carrying the bolts, the three armatures and the two contact-pieces, a flange on the upper edge of the box, notches in such flange having inclined under edges, bolts adapted to turn in the cover and to enter the notches in the flange on the box and a radially-projecting head on the bottom end of each bolt adapted to engage the under side of the edge of the notch in the box-flange, substantially as and for the purpose described.

In testimony whereof I have signed my name to this specification in the presence of two subscribing witnesses.

HERMANN THEODOR HILLISCHER.

Witnesses:
ALVESTO S. HOGUE,
A. FUNK.